United States Patent
Jampani et al.

(10) Patent No.: US 9,955,316 B2
(45) Date of Patent: Apr. 24, 2018

(54) INDOOR POSITIONING SYSTEMS AND MEETING ROOM OCCUPANCY

(71) Applicant: BlackBerry Limited, Waterloo (CA)

(72) Inventors: Krishnam Raju Jampani, Kitchener (CA); Daryl Joseph Martin, Kitchener (CA); I-Ming Tsai, Waterloo (CA); Jason Christopher Beckett, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/803,530

(22) Filed: Jul. 20, 2015

(65) Prior Publication Data

US 2017/0026806 A1    Jan. 26, 2017

(51) Int. Cl.
| | |
|---|---|
| *H04W 24/00* | (2009.01) |
| *H04W 4/04* | (2009.01) |
| *G06Q 10/10* | (2012.01) |
| *H04L 29/08* | (2006.01) |

(52) U.S. Cl.
CPC .......... *H04W 4/04* (2013.01); *G06Q 10/1095* (2013.01); *H04L 29/08657* (2013.01)

(58) Field of Classification Search
CPC ....... H04W 4/02; H04W 64/00; H04W 8/245; H04W 4/04; H04L 29/08657; G06Q 10/1095
USPC ............. 455/456.1, 456.3, 456.6, 418, 550.1
See application file for complete search history.

(56) References Cited

U.S. PATENT DOCUMENTS

| | | | |
|---|---|---|---|
| 8,669,844 B2 | 3/2014 | Walker et al. | |
| 2004/0068441 A1* | 4/2004 | Werbitt | G06Q 20/20 705/16 |
| 2009/0265280 A1* | 10/2009 | Taneja | G06Q 50/188 705/80 |
| 2011/0010093 A1 | 1/2011 | Partridge et al. | |
| 2012/0078676 A1 | 3/2012 | Adams et al. | |
| 2012/0238248 A1 | 9/2012 | Jonsson | |
| 2014/0149519 A1* | 5/2014 | Redfern | H04L 65/403 709/206 |

(Continued)

FOREIGN PATENT DOCUMENTS

| | | |
|---|---|---|
| CN | 104268669 A | 1/2015 |
| CN | 205281554 U | 6/2016 |

OTHER PUBLICATIONS

International Search Report and Written Opinion dated Oct. 13, 2016.

(Continued)

*Primary Examiner* — Danh Le
(74) *Attorney, Agent, or Firm* — Rowand LLP

(57) ABSTRACT

A method of determining room occupancy of a room in a facility having an indoor positioning system with wireless access point fingerprints each correlated to a location in the facility. The method may include receiving a request from a computing device for a room occupancy assessment associated with the room. It may further include obtaining location data that correlates to the location of one or more people from the indoor positioning system and determining from the location data associated with the room whether the room is occupied. The determination of whether the room is occupied is then sent to the computing device.

21 Claims, 4 Drawing Sheets

(56) References Cited

U.S. PATENT DOCUMENTS

| | | | | |
|---|---|---|---|---|
| 2015/0127712 | A1* | 5/2015 | Fadell | G06Q 10/083 709/202 |
| 2015/0156031 | A1* | 6/2015 | Fadell | H04L 12/2816 700/276 |
| 2015/0247913 | A1* | 9/2015 | Messier | G01S 19/48 340/539.13 |
| 2015/0287310 | A1* | 10/2015 | Deiiuliis | G08B 21/10 340/628 |
| 2015/0372954 | A1* | 12/2015 | Dubman | H04L 51/12 709/206 |
| 2015/0373022 | A1* | 12/2015 | Dubman | H04L 63/10 726/3 |
| 2016/0021512 | A1* | 1/2016 | Krallman | H04W 4/04 455/456.3 |
| 2016/0021636 | A1* | 1/2016 | Krallman | H04W 64/00 455/456.1 |
| 2016/0088438 | A1* | 3/2016 | O'Keeffe | H04R 27/00 455/456.2 |
| 2016/0162844 | A1 | 6/2016 | Rachuri et al. | |

OTHER PUBLICATIONS

EPO, Extended European Search Report relating to EP application No. 16179825.1, dated Nov. 17, 2016.

\* cited by examiner

INDOOR POSITIONING SYSTEMS AND MEETING ROOM OCCUPANCY

TECHNICAL FIELD

The present disclosure relates to indoor positioning systems use of indoor positioning for meeting room occupancy management.

BACKGROUND

Indoor positioning systems are useful for determining device location within buildings. One type of indoor positioning system is based on wireless access point fingerprinting. A common indoor wireless network is a WiFi network based on the IEEE 802.11 standard. An indoor positioning system stores "fingerprints" of expected wireless access point signal associated with various points or location in the facility.

Meeting room allocation, scheduling and occupancy often relies upon a meeting organizer to correctly book the meeting room via a scheduling application and to faithfully adhere to start and end times. Many times people may use a meeting room without pre-booking the room via the scheduling system, or a pre-booked meeting may run late. Someone that has a subsequent booking of the meeting room may be unsure of whether the meeting room is occupied and whether he or she should possibly interrupt the meeting. If the meeting room is not equipped with a dedicated room occupancy sensor, e.g. a motion sensor, temperature sensor, or pressure sensor, for example, designed to detect the actual presence of a person, then someone outside the room may be unaware of whether the room is actually occupied.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
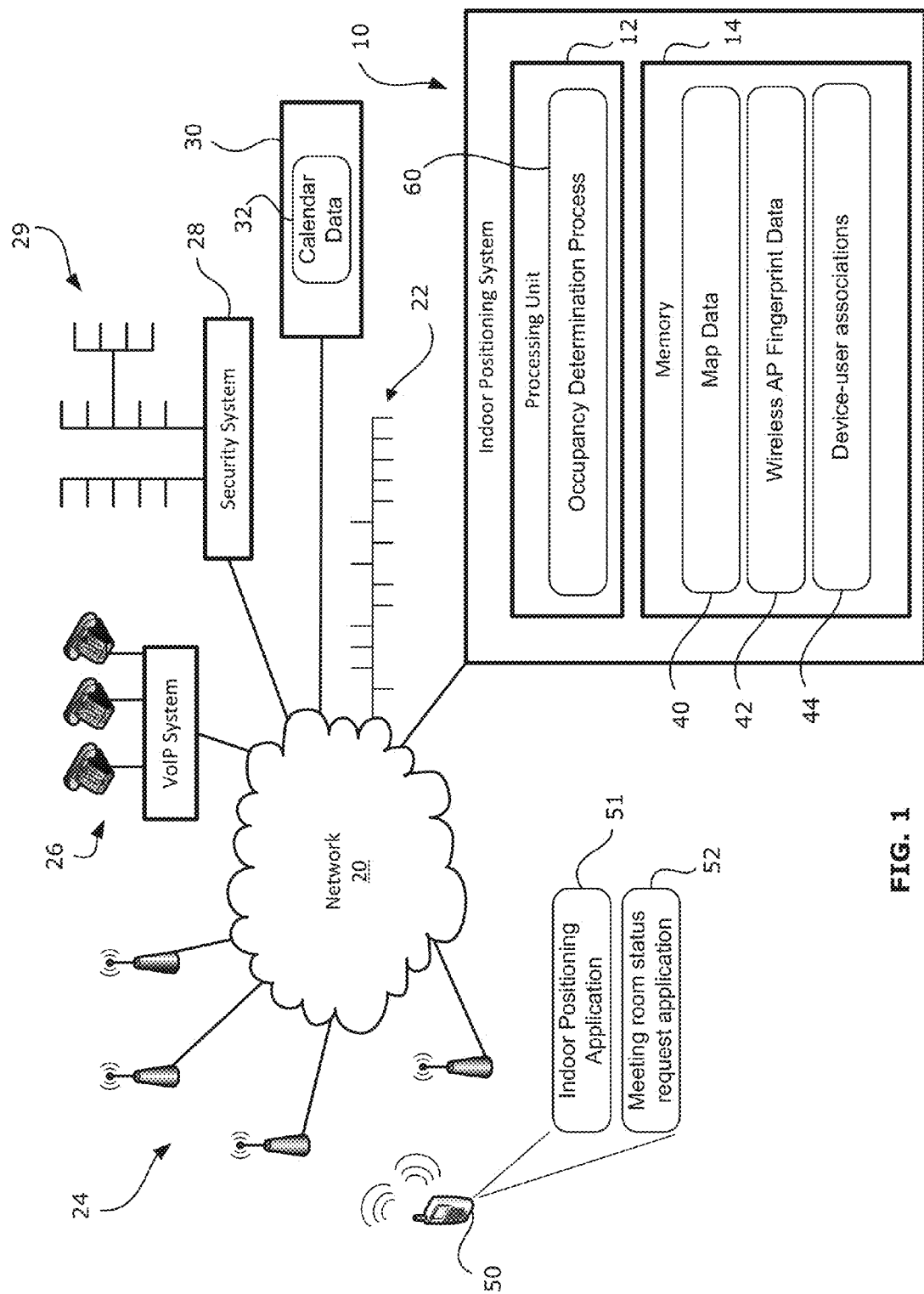
FIG. 1 diagrammatically shows one example of an indoor positioning system for a building.

In one aspect, the present disclosure provides a method of determining room occupancy of a room in a facility having an indoor positioning system with wireless access point fingerprints each correlated to a location in the facility. The method includes receiving a request from a computing device for a room occupancy assessment associated with the room; obtaining location data that correlates to the location of one or more people from the indoor positioning system; determining from the location data associated with the room whether the room is occupied; and sending the determination of whether the room is occupied to the computing device.

In yet another aspect, the present disclosure describes a server to determine room occupancy of a room in a facility having an indoor positioning system with wireless access point fingerprints each correlated to a location in the facility. The server includes a network connection to receive a request from a computing device for a room occupancy assessment associated with the room; and a processor to obtain location data that correlates to the location of one or more people from the indoor positioning system, determine from the location data associated with the room whether the room is occupied, and send the determination of whether the room is occupied to the computing device via the network connection.

In yet another aspect, the present disclosure describes a computer-readable medium storing processor-executable instructions which, when executed, cause a processor to perform one or more of the methods described herein.

Other example embodiments of the present disclosure will be apparent to those of ordinary skill in the art from a review of the following detailed descriptions in conjunction with the drawings.

In the present application, the term "and/or" is intended to cover all possible combination and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application may make reference to "position-inference data" associated with a user of a wireless device. This term is meant to include data that does not directly specify the current location of the wireless device, but which may be used to infer the location of the wireless device based on the association between the wireless device and the user. For example, GPS data from the wireless device, selection of a point/location on a map on the wireless device, or manually input location information are all "positional" data that directly specify the location of the wireless device. Position-inference data may include, for example, a meeting location in an entry in a user's calendar, from which it may be inferred that the user, and thus the wireless device, is present in that location at the time of that calendar entry. Another example is a user's assigned cubicle, which may be used, in conjunction with work hours and/or calendar data, to infer that the user's wireless device is likely in that cubicle location. In yet another example, position-inference data may include detection of a user's security card at a NFC access point, which may be used to infer that the user's wireless device is also likely at that access point location. Other examples of position-inference data will be appreciated based on the description below.

Any references herein to the term "employee" is not intended to be restrictive in terms of the relationship between the individual and the organization, and should be interpreted broadly as including any individual within an organization.

Many contemporary handheld devices contain a Global Navigation Satellite System (GNSS) chip and antenna, such as a Global Positioning System (GPS) chip and antenna. This enables the handheld device to determine its location using broadcast signals received from four or more satellites. Naturally, to function correctly, the handheld device must have a direct line-of-sight to the four or more satellites, meaning that GNSS systems do not work well indoors. Moreover, the resolution and accuracy (depending on the system) may be in the range of several meters (for nonlicensed civilian use). Accordingly, GNSS systems are not suitable for use in connection with indoor positioning systems.

Indoor positioning systems are useful for determining device location in GNSS-denied environments, such as within buildings. A system capable of determining a device's location with accuracy in a building or campus enables a number of potential applications, including indoor navigation.

One type of indoor positioning system is based on wireless access point (AP) fingerprinting. A common indoor wireless network is a WiFi network based on the IEEE 802.11 standard. An indoor positioning system may base positioning decisions on a map of the signals detected from installed WiFi APs at various points in a building or campus. The WiFi APs each broadcast packets, often advertising the BSSID of the WiFi AP. A handheld device may measure the received signal strength to produce a received signal strength indicator (RSSI) for each WiFi AP signal it can detect. The RSSI measurement from one or more WiFi APs may be correlated to a location on a facility map.

In order to determine expected WiFi RSSI measurements at various locations in the facility, the map is typically built manually. In particular, a facility or IT staff member typically must go to each location in a facility with a handheld device, which then takes WiFi RSSI measurements. The staff member then manually reports his or her location on the facility map so that it can be associated with the RSSI measurements taken at that location. It will be appreciated that this may be a labour-intensive task.

In some example implementations, an indoor positioning system uses crowd-sourcing to create or refine its wireless AP fingerprinting data. In a work environment, the data may be obtained from devices associated with a plurality of employees. Rather than relying upon the employees to actively and manually report location information, such a system may use position-inference user-associated data, which is used to determine a probable location and, thus, to associate wireless AP signal measurement data from a device associated with that user with that probable location, correlated in time. A suitable confidence weighting may be applied to various measurements based on the reliability of the probable location determination, which may depend on the nature of the position-inference user-associated data. In some embodiments, the weight may also take into account the number of measurements, consistency/variability, and/or number of sources/users, among other factors.

Reference is now made to FIG. 1, which diagrammatically shows one example embodiment of an indoor positioning system 10 connected to a network 20. The network 20 may include one or more wired or wireless networks, or combinations of both. For example, the network 20 may be an intranet installed in a specific building or collection of buildings, e.g. a campus, for an organization such as a university, a corporation, or the like. The network 20 includes a plurality of wireless APs 24, such as WiFi APs. The wireless APs 24 provide wireless network coverage within the facility and provide connectivity to a mobile device and other computing devices equipped for wireless communication using a designated protocol (e.g. IEEE 802.11). The wireless APs 24 are distributed throughout the facility/building in known locations and each wireless AP 24 is configured to periodically broadcast an identifier unique to that wireless AP 24.

The network 20 may connect to, or include, a number of other systems or subsystems. For example, the network 20 may include a plurality of Ethernet ports 22 or other physical ports for connecting computing devices to the network 20. The Ethernet ports 22 may be distributed throughout the facility. The facility may also feature a security system 28 for permitting access by way of security card or other magnetic or near-field communication device. Accordingly, the security system 28 in this embodiment features a plurality of NFC readers 29, each NFC reader 29 corresponding to a security access point, such as a door or turnstile, requiring an authorized communication from a passcard, smartphone, key fob, or the like. The security system 28 may be connected to the network 20.

In some embodiments, the network 20 may also connect to a VoIP system 26 featuring a plurality of desktop VoIP phones. Each VoIP phone in the VoIP system 26 may be associated with a specific location (e.g. an office, cubicle, etc.). In most instances, the VoIP phones are connected to Ethernet ports and the communications traffic from the VoIP phones are routed by the network 20 to a server or servers that operate and implement the VoIP system 26.

The network 20 may connect to a number of other servers 30 that execute various functions, such as storing and maintaining calendar data 32 for example. The calendar data 32 may be stored and managed within a scheduling program or integrated email/calendar/reminder program, such as that implemented by Microsoft™ Exchange®, for example. The calendar data 32 may provide information regarding scheduled meetings, locations, attendees, etc.

A wireless device 50 equipped for wireless communication via the wireless APs 24 is capable of receiving broadcast messages or signals output by the wireless APs 24. In known manner, the wireless device 50 measures the received signal strength (RSSI) of detected signals from the wireless APs 24. The wireless device 50 may include an indoor positioning application 51. The indoor positioning application 51 detects RSSI measurements for wireless AP signals and attempts to correlate them with wireless AP fingerprints that are themselves correlated to a location in the facility. In this manner, the indoor positioning application 51 may determine the current location of the wireless device 50. The wireless AP measurements may be obtained from a chipset, such as a WiFi chip, in some embodiments. The indoor positioning application 51 may include a graphical map interface module for displaying a map of the facility with an indicator of the determined location, so as to communicate current position to the user.

From time-to-time, the indoor positioning system 10 may transmit updated fingerprint data to wireless devices, like the wireless device 50, for use by the indoor positioning application 51. The indoor positioning system 10 may also transmit updated map data as the facility map is refined and improved.

In some embodiments, the indoor positioning application 51 may not determine the wireless device's location in the facility directly, but may send the measured RSSI values to the indoor positioning system 10, which then performs the computational work of correlating the measured RSSI values to wireless AP fingerprints and, in response, sends the wireless device the determined location.

The indoor positioning system 10 may include a processing unit 12 and memory 14. The processing unit 12 may include one or more processing units in one or more computing devices, e.g. servers. The memory 14 includes map data 40 defining the boundaries and accessible and inaccessible areas of the facility and wireless AP fingerprint data 42. The wireless AP fingerprint data 42 is data for one or more locations or positions in the facility, i.e. at a point on the map, and corresponding expected wireless AP measurements at that location associated with a plurality of wireless APs. The expected wireless AP measurements may be based upon collected data from wireless devices that have reported measurements from that location. In some cases, the wireless AP fingerprint data includes a history of all such measurements associated with a certain location, an average, a weighted average, or some other combination of actual measurements of a given wireless AP's signal strength that produces an expected value. In some embodiments, the indoor positioning system 10 includes both a history (or partial history) of wireless AP measurements reported from a certain location and a wireless AP fingerprint derived from those measurements, where the wireless AP fingerprint specifies the expected measurement values.

Wireless AP fingerprint data 42 allows the indoor positioning system 10 (or an application on a mobile device that receives the wireless AP fingerprint data from the indoor positioning system 10) to determine the current position of a mobile device based on detected wireless AP RSSI values.

The memory 14 may also store device-user associations 44, specifying the association between each wireless device 50 and a user. The association may link a wireless device identifier (e.g. a phone number, serial number, etc.) with a user identifier (e.g. a name, employee number, etc.).

Example sources of position-inference data include the Ethernet ports 22, the VoIP system 26, the security system 28, and calendar data 32. Additional and alternative sources may be used in some embodiments.

Meeting room allocation, scheduling and occupancy often relies upon a meeting organizer to correctly book the meeting room via a scheduling application and to faithfully adhere to start and end times. Many times people may use a meeting room without pre-booking the room via the scheduling system, or a pre-booked meeting may run late. Someone that has a subsequent booking of the meeting room, or simply wishes to use the room if unoccupied, may be unsure of whether the meeting room is currently occupied and whether he or she should possibly interrupt a meeting in progress. If the meeting room is not equipped with a dedicated room occupancy sensor, e.g. a motion sensor, temperature sensor, or pressure sensor, for example, designed to detect the actual presence of a person, then someone outside the room may be unaware of whether the room is actually occupied.

One possible application for the indoor positioning system 10 is to determine whether a room is occupied. The indoor positioning system 10, alone or in conjunction with data from other systems, may be used to determine whether a meeting room is occupied. The determination may be made on the basis of achieving a threshold level of confidence that the room is occupied.

In one embodiment, a wireless device may be equipped with an application or module for requesting a meeting room status, as indicated by reference numeral 52. In some embodiments, such an application or module may be embedded within the indoor positioning application 51. In either case, a wireless device user that wishes to know the status of meeting room initiates a request via the application 52. The request may also originate from a non-wireless device, such as a desktop computer, laptop computer, or other computing device.

The request may include selecting the specific meeting room on an interface that displays a map of the facility or a list of room names or numbers in some embodiments. In the case of a request from a wireless device, in some embodiments, the request is associated with the present location of the wireless device, which may be determined by the indoor positioning application 51 based on wireless AP measurements taken by the wireless device. The present location information may be included in the request.

The processing unit 12 of the indoor positioning system 10 may execute an occupancy determination process 60 for responding to a request sent by the meeting room status request application 52 from the wireless device 50. The occupancy determination process 60 receives the room occupancy request from the wireless device 50 and attempts to determine the occupancy status of the room identified in the request. To determine the occupancy status of a room, the occupancy determination process 60 obtains location data relating to one or more people from the indoor positioning system 10. It may also receive other data relevant to room occupancy assessment, as will be described further below. The occupancy determination process 60 may then combine the location data and any other data to make a determination as to occupancy status of the room. In one embodiment, some data may have a high correlation with the presence of someone in the room, and may result in a determination that the room is occupied. For example, if there are check-ins, e.g. Ethernet ports, NFC scanners, motion sensors, etc., specific to the room that indicate the presence of at least one person, this may result in a determination that the room is likely occupied. Other data may not be as directly correlated with presence of a person in the room, but may nonetheless be used to assess the occupancy status. For example, location data from the indoor positioning system 10 may be used to determine whether there are people in the vicinity of the room. Correlating indoor location data with calendar data indicating whether a meeting is currently scheduled for the room and whether any of the designated participants in that meeting are among the people determined to be located near the room, may serve to improve confidence in the likelihood that the room is either occupied or unoccupied.

Although the occupancy determination process 60 is shown in FIG. 1 as part of the indoor positioning system 10, in other embodiments it may be executed by another system or other servers 30. For example, it may be part of a calendar management or scheduling application or server that maintains and manages the calendar data 32.

Figure 2:
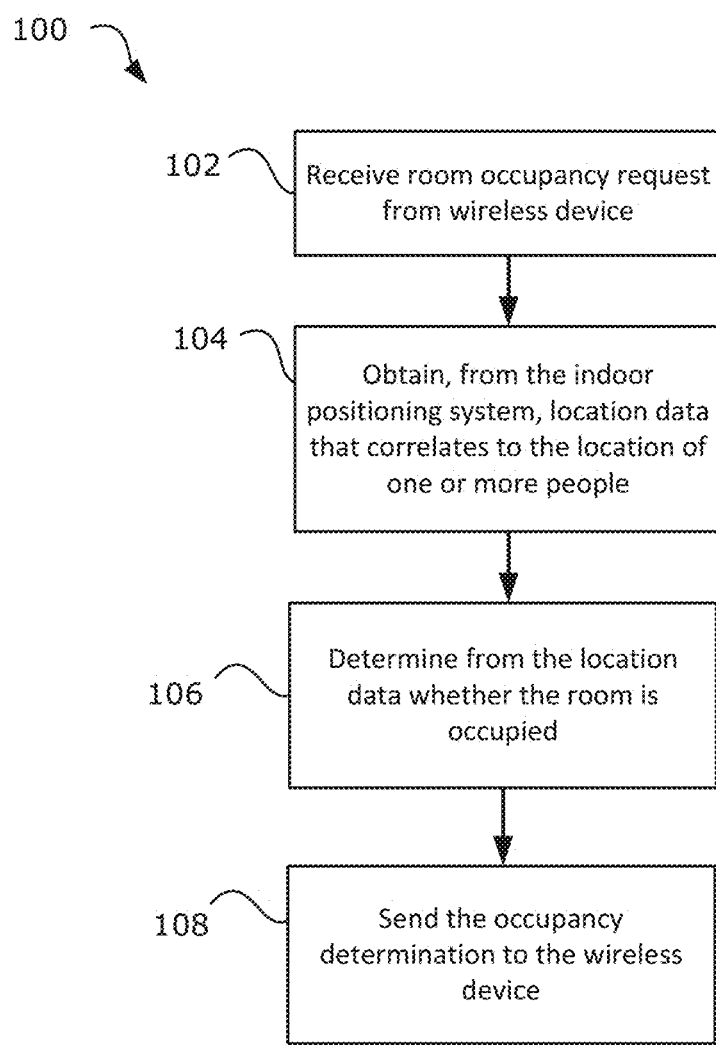
FIG. 2 shows, in flowchart form, one example process for determining room occupancy.

Reference is now made to FIG. 2, which shows, in flowchart form, one example process 100 for determining whether a room is occupied. In this embodiment, the process 100 is based upon location data from the indoor positioning system. A high-probability sensor, such as a room occupancy sensor, e.g. a motion sensor, is presumed to be unavailable for the room in question. Accordingly, the process 100 is used to assess room occupancy. The process 100 may be implemented by a server or other computing device executing one or more software routines designed to carry out the functions described below.

In operation 102, a request for a determination of room occupancy is received. The request originates from a computing device. The computing device may, in some cases, be a wireless device associated with a requesting user. In some other embodiments, the computing device may be a deskop computer, laptop, tablet, mobile smartphone, or other such device. The request may include information identifying the wireless device or the requesting user, or both. The request may further include information identifying the room. In one embodiment, the request includes an identifier specific to the room. The requesting user of the computing device may trigger the room request using the meeting room status request application, which may include an interface for receiving room selection. The interface may include a facility map allowing, for example, touchscreen or menu selection of the room. In some embodiments involving a mobile wireless device, the provided interface may navigate to the portion of the facility map corresponding to the device's current location as determined through the indoor positioning application, to facilitate easy selection of a local room without excessive navigation of the interface required. Other mechanisms for selecting or identifying the room associated with the occupancy status request may also be used.

In operation 104, location data is obtained that correlates to the location of one or more people. In particular, the location data is obtained from the indoor positioning system. In some embodiments, the indoor positioning system may receive regular data from wireless devices within the facility regarding the wireless access point signals sensed by each device, and may therefore maintain a constant record of the location of each of the wireless devices (through correlation with wireless AP fingerprints). In such a "constant-monitoring" embodiment, the indoor positioning system is able to provide details regarding the location of a plurality of wireless devices, each of which is associated with one of the employees/users of the facility. In some embodiments, the indoor positioning system may not perform such constant monitoring, and in operation 104 the system may initiate a request to a plurality of wireless devices to provide their current wireless AP measurements, from which the system may then determine the location of each of the devices through correlation with the wireless AP fingerprints. In some embodiments, the plurality of wireless device polled may include all wireless devices known to the indoor positioning system (e.g. all those that use the indoor positioning application), or a subset of all wireless devices. In one embodiment, the system may only poll those devices associated with the expected attendees of a meeting currently scheduled for the room to determine whether those persons are likely near or in the room.

In operation 106, the location data is used to determine whether the room is occupied. In particular, the determination of whether the room is occupied or unoccupied is made based on location data from the indoor positioning system. In one embodiment, the determination may evaluate whether all (or substantially all) the attendees of a meeting scheduled for the room are indicated by the location data as being in the room. If so, the room is occupied and if not, then it is not.

In another embodiment, the determination may evaluate whether more than a threshold number of the attendees of a meeting scheduled for the room are indicated by the location data as being in the room. If so, the room is occupied and if not, then it is not. The threshold may be one person in some embodiments. The threshold may be the higher of one person and a percentage number of attendees, such as 40% for example.

In yet another embodiment, the determination may evaluate whether the location data indicates that more than a threshold number of people are in the room, irrespective of whether a meeting is scheduled. In some instances, the threshold may be set to one, since a single person may be occupying the room in order to use the conference facilities for a teleconference or videoconference meeting. The threshold number may be two or more in some implementations, since there are usually at least two people in a meeting, particularly if the system is separately able to determine whether any conference equipment in the room is in use, which would address the possibility of one person being in the room for that purpose. In some cases, it may be three or more to account for the possibility of the indoor positioning system counting the requesting user within the number persons (if the request comes from a wireless device proximate the room). In some embodiments, the location of the requesting user is detected and the location data of that user is excluded from the determination of whether the room is occupied.

If the indoor positioning system is able to pinpoint locations with sufficient accuracy, then the determination may require an indication of a person present inside the room. If not, then the determination may be based on people indicated as being less than a certain distance from the room, where the distance may depend on the resolution accuracy of the indoor positioning system. In such a system, the determination may take into account the likelihood that the requesting user and/or other persons with the requesting user are likely proximate the room, so an indication of one or more people near the room is not necessarily indicative of the room being occupied. In some embodiments, the location data for the requesting user may be excluded from the determination of whether the room is occupied.

Other algorithms may be used to determine the room's occupancy status based upon location data from the indoor positioning system. In some implementations, the location data may be combined with data from other systems, such as calendar data (as noted above in connection with meetings scheduled for the room and location of attendees for that meeting), or other data.

Once a determination is made in operation 106 as to whether the room is occupied or not, the determination is communicated to the requesting user by transmission to the wireless device in operation 108.

Figure 3:
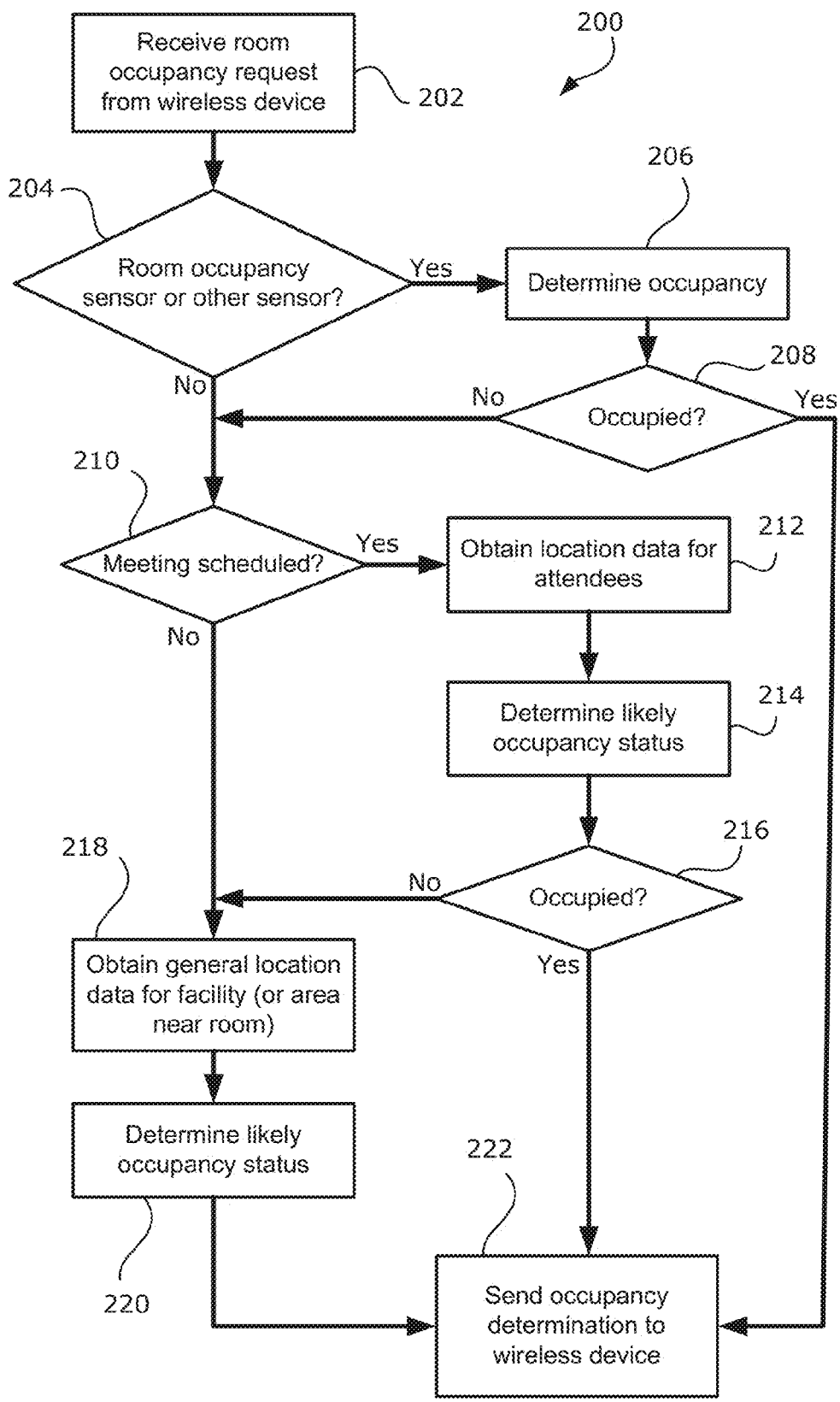
FIG. 3 shows, in flowchart form, another example process for determining room occupancy.

Reference will now be made to FIG. 3, which shows a flowchart illustrating another example process 200 for determining room occupancy based on indoor positioning system location data. The process 200 may be implemented by a server or other computing device.

The process 200 begins in operation 202 with receipt of the occupancy status request from a requesting user by way of data communication from that user's wireless device. The request may include information identifying the wireless device or the requesting user, or both. The request may further include information identifying the room. In one embodiment, the request includes an identifier specific to the room. The requesting user of the wireless device may trigger the room request using the meeting room status request application, which may include an interface for receiving room selection. The interface may include a facility map allowing, for example, touchscreen or menu selection of the room. In some instances, the provided interface may navigate to the portion of the facility map corresponding to the device's current location as determined through the indoor positioning application, to facilitate easy selection of a local room without excessive navigation of the interface required. Other mechanisms for selecting or identifying the room associated with the occupancy status request may also be used.

In this example, in operation 204 it is determined whether the room has an associated room occupancy sensor (e.g. motion sensor or the like) or other directly-correlated occupancy-associated sensor (e.g. a VoIP phone, an Ethernet port, etc.). If so, then in operation 206, the occupancy status of the room is determined from the sensor. For example, if the room has an occupancy sensor, it is determined whether the sensor reports an occupant. Likewise, if the room has a VoIP phone, and the phone is determined to be in active use, then the room may be presumed to be occupied. In operation 208, the process 200 assesses whether the room has been definitively determined to be occupied. If so, then the process 200 continues to operation 222 to report to the requesting user that the room is occupied. The room occupancy sensor and other in-room sensors of presence may be considered to be high reliability, so when they indicate that the room is occupied then the determination may be made without considering location data. However, in operation 208, if the process 200 finds that the sensors do not indicate presence of a person, then it is not necessarily conclusive. In one embodiment, if a motion sensor indicates that the room is unoccupied, then it may be definitive enough to continue to operation 222 to report that the room is unoccupied without assessing location data; however, other sensors such as Ethernet ports or VoIP phones may not necessarily be in use while people are present, so the lack of use of those sensors does not necessarily mean the room is unoccupied. Therefore, if they do not indicate that the room is occupied, then the process 200 continues at operation 210.

In operation 210, the process 200 evaluates whether a meeting is currently scheduled for the room. This may include obtaining calendar data from a server or other computing device that centrally manages scheduling of the meeting rooms for the facility. An example system may be a Microsoft Exchange™ system or the like. If a meeting is currently scheduled for the room, then in operation 212 the system obtains location data for the attendees that are specified for the meeting (if any). As discussed above, the location data may be maintained by the indoor positioning data on a constant monitoring basis for all wireless devices in some embodiments. In this case, operation 212 involves requesting the location data from the indoor positioning system for the attendees of the meeting specified in the calendar data. If the indoor positioning system does not perform constant location monitoring, then operation 212 may involve requesting that the indoor positioning system determine the location of those persons listed as attendees. In response to that request, the indoor positioning system may query the wireless devices associated with those persons for their current wireless AP signal measurements and may, based on that information, determine the location of those wireless devices and, thus, the likely location of those persons. In either case, the process 200 receives location data for the attendees of the meeting.

In operation 214, the likely occupancy status of the room is determined from the location data provided regarding the attendees to the meeting scheduled. As discussed above, various algorithms or heuristics may be used to determine occupancy status from location data. For example, if at least one of the attendees is indicated as being in the room, then it is occupied. In another example, if at least a threshold number of the attendees are indicated as being in the room, then it is occupied. In yet another example, if the indoor positioning system resolution is too coarse to reliable place persons in the room, then the determination may be based on a threshold number of persons (perhaps excluding the requesting user) being within a threshold distance of the room. It will be understood that other heuristics may be used in other embodiments.

Having determined the likely occupancy status, then in operation 216 the process 200 evaluates whether the room has been determined to be occupied by the meeting attendees. If so, then the process 200 may report the occupied status of the room to the requesting user in operation 222. If not, then the process 200 may go on to evaluate whether other persons may be occupying the room despite the scheduled meeting.

In operation 218, general location data for the facility may be obtained from the indoor positioning system. This may include obtaining location data for all persons determined to be proximate the room (for example, within a threshold distance). It may include obtaining location data for all persons known to the indoor positioning system (for example, all wireless devices registered with the system and reporting wireless AP measurements).

In operation 220, it is determined whether it is likely that the room is occupied based on the location data from the indoor positioning system. As with operation 214, this determination may be based on more than a threshold number of persons being indicated as being in the room or within a threshold distance of the room. The threshold distance or the threshold number of persons in operation 220 are not necessarily the same thresholds as used in operation 214. As an example, when evaluating occupancy based on location of attendees to a scheduled meeting, the room may be considered occupied if at least one of attendees is located in or near the room, whereas when evaluating occupancy based upon the location of all persons, the room may be considered occupied of at least two persons are located in or near the room. In many embodiments, such determinations may exclude location data relating to the requesting user.

Having determined the room occupancy status in operation 220, the occupancy status is reported to the requesting user in operation 222. The report may indicate the determined occupancy status, which may be displayed in a graphical user interface on the requesting user's wireless device, or indicated in message or other notification. In some embodiments, the report may indicate a confidence level. For example, if the occupancy determination is based on a room occupancy sensor and the room is determined to be occupied, it may indicate a high degree of confidence. If the room occupancy determination is based on location data for persons-at-large and is based on having a threshold number of people within a certain distance of the room, the confidence level may be lower. A range of confidence levels may be communicated and may be related to the number of persons determined to be in or near the room.

In some instances it may be at least temporarily impractical to implement a room occupancy determination system in reliance upon an indoor positioning system, as described above, due to a lack of reliable WiFi fingerprints and/or a lack of deployment of the indoor positioning application to the mobile devices of all personnel in the facility. Accordingly, in an alternative embodiment the system may include a manual check-in via a meeting room application that has an associated indoor positioning component. In this embodiment, when a user equipped with a mobile device running the application wishes to occupy a meeting room, the user "checks-in" using the application. That is, the user selects the meeting room to indicate that the user is currently using the meeting room. The application then begins reporting detected WiFi readings to the indoor positioning system. This assists the indoor positioning system in building a robust WiFi fingerprint for that meeting room. It may also allow for the indoor positioning system to determine when the user has left the meeting room, thereby relieving the user of the requirement to "check-out" of the meeting room. It will be understood that while the user is "checked-in" to the meeting room, anyone that requests the meeting room occupancy status will be informed that the meeting room is occupied. It will also be understood that this embodiment may be implemented on its own or together with the meeting room occupancy determination processes described above.

Figure 4:
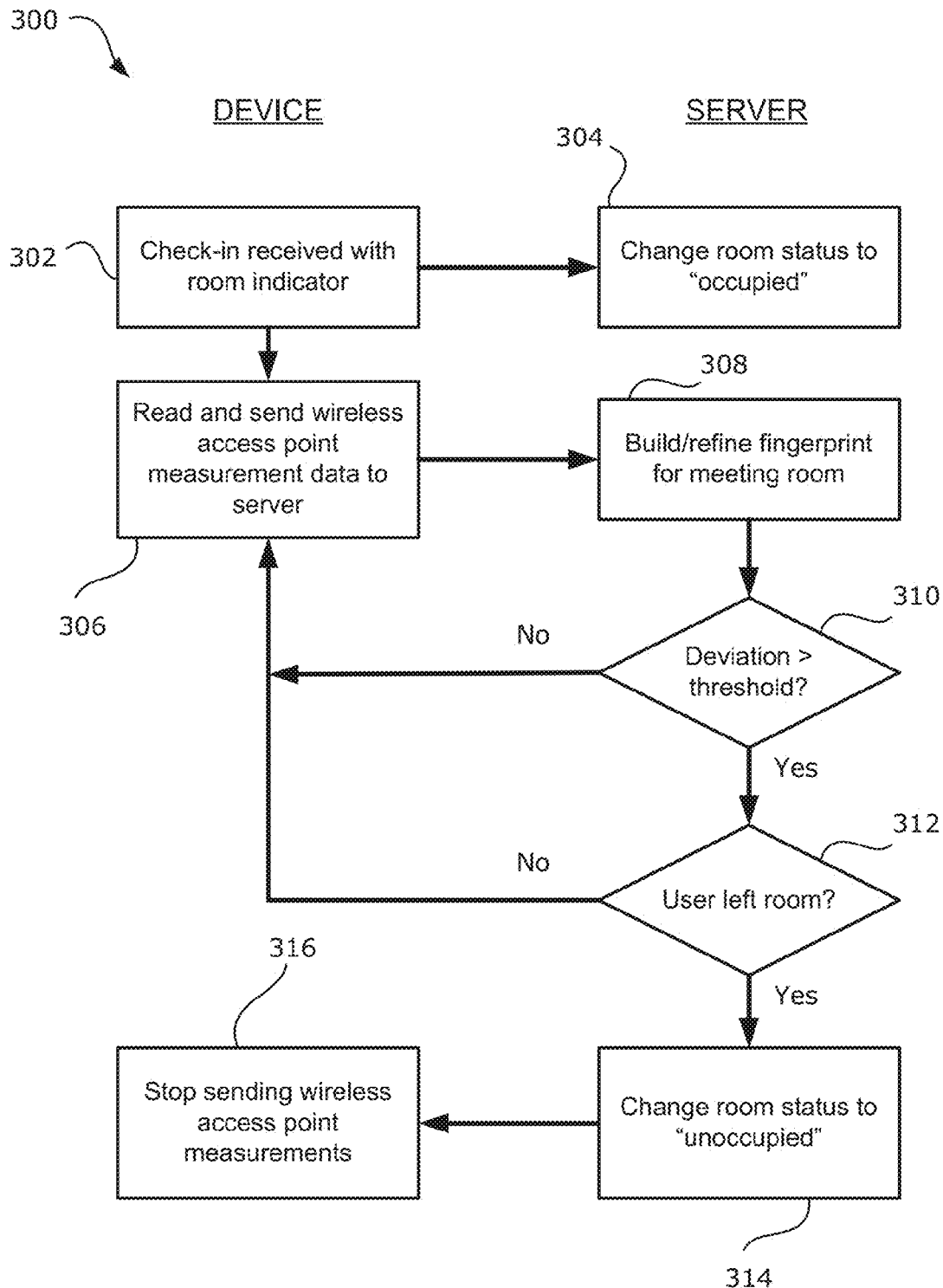
FIG. 4 shows, in flowchart form, a further example process for determining meeting room occupancy.

Reference is now made to FIG. 4, which shows, in flowchart form, one example process 300 to determine meeting room occupancy. The example process 300 is partly implemented by way of a meeting room application executing on a mobile device in the possession of a user, and party implemented by way of a server having an indoor positioning component.

The process 300 is initiated by the user of the mobile device "checking-in" to a room. The "check-in" may be carried out by having the user select the room through a user interface on the mobile device provided by the meeting room application. In some instances, the user interface may provide a map or other visual indication of location and an option to "check-in" or "book" a room by selecting it on the map. In another example, the room itself may have a check-in point, such as an NFC device, a bar code, a QR code, or other scannable device or tag that the mobile device detects for the purpose of checking into that room. Howsoever it is indicated by the user, whether through user interface input or through other mechanisms, the mobile device receives the check-in command with a room selection, as indicated by operation 302.

The mobile device may then report this check-in occurrence to server, for example via a wireless data connection using the Intranet of the facility or using one or more public data networks. In operation 304, the server receives this information from the mobile device and, in response, changes the status of the selected room to "occupied". In this manner, if anyone else requests the status of the selected room, the server may then report that the room is occupied on the basis of the check-in by the user.

Having reported the "check-in", the mobile device then periodically detects wireless access point signals and reports those readings to the server, as indicated by operation 306. The mobile device may report wireless access point signal measurements on a fixed periodic basis in some embodiments. In some other embodiments, the mobile device may initially provide measurements on a more frequent basis and then, over time, less frequently, particularly if the measurements do not deviate by a threshold amount. If the measurements are fairly constant, then it indicates that the mobile device is likely stationary. However, if the measurements change by more than a threshold amount it may indicate that the mobile device has moved. The movement may be movement within the room or it may mean that the user has left the room.

At the server, in operation 308, the received measurements may be used to build a wireless access point fingerprint for that meeting room location. In some embodiments, the fingerprint may be built or refined within an indoor positioning system. That is, the server may have a database of fingerprints for the facility and the received data may be used to refine the fingerprint associated with that meeting room. In another embodiment, however, the fingerprint may be built for the purpose of meeting room occupancy determination and not within the context of a general indoor positioning system.

In operation 310, the server assesses whether the recently received wireless measurement deviates from the current fingerprint for that location by more than a threshold amount. If not, then the process 300 awaits further measurements from the mobile device in operation 306. It will be appreciated that this threshold test may not be implemented at the server if the device conditionally reports wireless measurements whenever the measurements differ from previous measurements by more than a threshold amount, or may only be implemented at the server for early measurements by the device before the device implements its own threshold test for determining whether to report measurements.

If, in operation 310, the measurement is found to deviate from the past measurements (or the fingerprint for the meeting room) by more than a threshold amount, then the server may determine whether the mobile device has left the room in operation 312. It may, for example, query the mobile device so as to solicit user input. Operation 312 may involve a test for determining whether wireless signal measurements indicate departure from the meeting room. For example, the test may evaluate whether the measurements indicate more than a second higher threshold deviation from the fingerprint associated with the meeting room. In another example the test may evaluate whether the measurements indicate detection of one or more wireless access points not included in the fingerprint, thereby indicating a distinctly different location. In some embodiments, in response to determining that the user is in a distinctly different location, the lower weight may be applied to recent measurements from the mobile device in terms of refining the fingerprint for the meeting room since those measurements may have occurred while moving out of the room and may be less reliable.

In operation 312, if the measurements do not indicate that the mobile device has left the room, then the process 300 returns to operation 306 to await further measurements. If the measurements do indicate that the mobile device has left the room, then in operation 314 the server updates the status of the meeting room to "unoccupied". The server-based determination that the room has ceased to be occupied may be considered an automatic "check-out".

In some embodiments, the server may instruct the mobile device to stop sending wireless access point measurements in operation 316. Because the server has "checked-out" the user and mobile device from the meeting room the server no longer necessarily needs to monitor whether the device remains in the room and the mobile device does not need to necessarily continue sending wireless access point measurements to the server (unless the device is configured to do so continually for the purpose of an indoor location system).

While the present application includes some descriptions of methods, a person of ordinary skill in the art will understand that the present application is also directed to various apparatus such as a handheld electronic device and a server. The handheld electronic device and the server include components for performing at least some of the example aspects and features of the described methods, be it by way of hardware components (such as the memory and/or the processor), software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD)

or Blu-Ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A method performed in a communication system for determining room occupancy of a room in a facility having an indoor positioning system with wireless access point (AP) fingerprints each correlated to a location in the facility, the method comprising:
receiving, at the communication system, a request from a computing device for a room occupancy assessment associated with the room;
obtaining location data, from the indoor positioning system, that correlates to the location of wireless devices associated with each of one or more people within the facility;
obtaining data correlated to room occupancy from at least one of the network connected devices selected from a room check-in scanner, an in-room data port, an in-room charging port, or an in-room telephone, the data being position-inference user data for the wireless devices associated with each of the one or more people;
determining, based on the location data and the position-inference user data, whether the room is occupied; and
sending the determination of whether the room is occupied to the computing device.

2. The method of claim 1, further comprising obtaining room schedule data associated with the room from a room scheduling system and determining from the room schedule data whether a meeting is currently scheduled for the room, wherein said determining includes determining whether the room is occupied based on the location data and the room schedule data.

3. The method of claim 2, further comprising identifying, from the room schedule data, the attendees of the meeting and wherein obtaining comprises obtaining location information associated with each of the attendees.

4. The method of claim 3, wherein determining includes determining that the room is likely unoccupied if the location data indicates that none of the attendees is located proximate the room.

5. The method of claim 1, wherein, if the location data indicates two or more people located proximate the room, then determining comprises determining that the room is likely occupied.

6. The method of claim 1, wherein, if the location data indicates fewer than two people located proximate the room, then determining comprises determining that the room is likely unoccupied.

7. The method of claim 1, wherein the computing device comprises a wireless device, the request includes location data for the wireless device, and the method further comprises identifying the room based upon the location data for the wireless device.

8. The method of claim 1, wherein the request includes room identifying information specifying the room.

9. The method of claim 1, wherein determining further includes determining a level of confidence in the determination of whether the room is occupied.

10. The method of claim 9, further comprising determining how many people are located proximate the room, and wherein the level of confidence is based, at least partly, upon the number of persons determined to be located proximate the room.

11. A communication system to determine room occupancy of a room in a facility having an indoor positioning system with wireless access point fingerprints each correlated to a location in the facility, the communication system comprising:
a network;
a plurality of network connected devices;
a network connection to receive a request from a computing device for a room occupancy assessment associated with the room via the network; and
a processor to
obtain location data, from the indoor positioning system, that correlates to the location of wireless devices associated with each of one or more people within the facility;
obtain data correlated to room occupancy from at least one of the network connected devices selected from a room check-in scanner, an in-room data port, an in-room charging port or an in-room telephone, the data being position-inference user data for the wireless devices associated with each of the one or more people;
determine, based upon the location data and the position-inference user data, whether the room is occupied, and
send the determination of whether the room is occupied to the computing device via the network connection.

12. The server of claim 11, wherein the processor is to obtain room schedule data associated with the room from a room scheduling system and determining from the room schedule data whether a meeting is currently scheduled for the room, wherein said determining includes determining whether the room is occupied based on the location data and the room schedule data.

13. The server of claim 12, wherein the processor is to identify, from the room schedule data, the attendees of the meeting and to obtain location data by obtaining location information associated with each of the attendees.

14. The server of claim 13, wherein the processor is to determine by determining that the room is likely unoccupied if the location data indicates that none of the attendees is located proximate the room.

15. The server of claim 11, wherein, if the location data indicates two or more people located proximate the room, then the processor is to determine by determining that the room is likely occupied.

16. The server of claim 11, wherein, if the location data indicates fewer than two people located proximate the room, then the processor is to determine by determining that the room is likely unoccupied.

17. The server of claim 11, wherein the computing device comprises a wireless device, the request includes location data for the wireless device, and the processor is to identify the room based upon the location data for the wireless device.

18. The server of claim 11, wherein the request includes room identifying information specifying the room.

19. The server of claim 11, wherein the processor is to determine a level of confidence in the determination of whether the room is occupied.

20. The server of claim 19, wherein the processor is to determine how many people are located proximate the room, and wherein the level of confidence is based, at least partly, upon the number of persons determined to be located proximate the room.

21. A non-transitory computer-readable medium, storing processor-executable instructions that, when executed by one or more processors, cause the one or more processors to carry out the method claimed in claim 1.

* * * * *